United States Patent
Niegel et al.

(10) Patent No.: US 6,633,557 B1
(45) Date of Patent: Oct. 14, 2003

(54) COMBINER

(75) Inventors: Michael Niegel, Lauf (DE); Ralf Kukla, Nuremberg (DE); Seyed-Hami Nourbakhsh, Nuremberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/437,237

(22) Filed: Nov. 10, 1999

(30) Foreign Application Priority Data

Nov. 13, 1998 (EP) ............................................. 98121518

(51) Int. Cl.[7] ............................................. H04B 7/216
(52) U.S. Cl. ...................... 370/342; 370/537; 370/538; 370/539
(58) Field of Search ................................ 370/477, 535, 370/538, 539, 540, 541, 545; 341/61, 67, 94, 100, 101; 345/29; 327/407; 365/83, 219; 375/211, 214

(56) References Cited

U.S. PATENT DOCUMENTS

| | | | | |
|---|---|---|---|---|
| 3,619,510 A | * | 11/1971 | Zegers et al. ............... | 370/515 |
| 3,715,508 A | | 2/1973 | Blasbalg | |
| 3,872,257 A | * | 3/1975 | Bleickardt et al. .......... | 370/506 |
| 5,091,907 A | * | 2/1992 | Wettengel .................... | 370/505 |
| 6,377,613 B1 | * | 4/2002 | Kawabe et al. ............. | 375/142 |

FOREIGN PATENT DOCUMENTS

| | | |
|---|---|---|
| EP | 0 304 841 A2 | 1/1989 |
| WO | WO 95/23464 | 8/1995 |

OTHER PUBLICATIONS

"Analysis and Synthesis of Delay Line Periodic Filters" IRE Transactions on Circuit Theory, Jun. 1957, p. 41–53.
"Mechanisms to Ensure a Reliable Packet Combining Operation in DS/SSMA Radio Networks with Retransmission Diversity" Annamalai et al., 48th IEEE Vehicular Technology Conference, vol. 2, 18–21 May 1998, p. 1448–1452.

* cited by examiner

Primary Examiner—Seema S. Rao
Assistant Examiner—Melanie Jagannathan
(74) Attorney, Agent, or Firm—Nixon & Vanderhye, P.C.

(57) ABSTRACT

Circuitry combines a plurality of digital communication channels in a telecommunication system with reduced hardware requirements. The circuitry accumulates samples of the input communication channels in a register using an adder. The bit width of the connection lines between the register and the adder may be selected considering the bit width and number of input communication channels, such that minimal bit widths are provided.

8 Claims, 3 Drawing Sheets

COMBINER

FIELD OF THE INVENTION

This invention relates to devices for combining a plurality of digital communication channels.

BACKGROUND OF THE INVENTION

In telecommunications systems, a large number of communication channels containing voice or data signals may be transmitted together via the same transmission medium, for example, a radio frequency band. A multitude of access schemes for placing communication channels on the transmission medium is known. One class of transmission schemes simultaneously transmits a plurality of different communication channels, e.g., in a radio frequency band, in such a way that they overlap in the time domain as well as in the frequency domain. A well-known access scheme of this class is CDMA (Code Division Multiple Access).

In order to distinguish each communication channel signal from other communication channel signals, each communication channel signal is encoded with one or more unique spreading codes, as it is well-known in the art. For spreading a particular communication channel for transmission, e.g., using CDMA, each symbol of the incoming data stream of the channel, e.g., having a logical value 1 or 0, is represented using the code sequence. For example, if the symbol has the logical value 1, the code sequence itself is transmitted, if the data bit has the logical value 0, then the inverted code sequence is transmitted, or vice versa.

After spreading, the spread communication channels are individually weighted, e.g., according to propagation characteristics and/or the location of the receiving station. Thereafter, the spread and weighted communication channels are combined, i.e., superimposed, to form a single transmission signal, e.g. a CDMA transmission signal, which then may be transmitted via a radio frequency band.

The combining step is usually performed by adding the individual sample values of all data streams of the spread and weighted communication channel signals. Hence, one sample value of the CDMA signal is obtained by summing the respective samples of all individual communication channel signals.

It is conceivable to the person skilled in the art, to add a plurality of individual channels $\phi 1$–$\phi 8$ using a cascaded arrangement of adders, as illustrated in FIG. 3. Here, each two input channels are combined by an adder 300 and, in a cascade, the outputs of each pair of adders are combined by a further adder 300. In the shown example, a cascade of three levels of adders generates the transmission signal, e.g., a CDMA signal.

This proceeding may work well for a small number of channels, however, in case of a larger number of channels, a potentially very large number of adders will be needed. In order to reduce hardware costs, alternative solutions for adding up larger numbers of channels are desirable.

SUMMARY OF THE INVENTION

It is therefore the object of the invention, to provide a device for combining a plurality of digital communication channels with reduced hardware effort and reduced costs.

This object of the invention is solved by and apparatus for combining, in a plurality of cycles, a plurality of digital communication channels, each being transmitted via communication lines having a first bit width, comprising: a multiplexer for multiplexing the plurality of digital communication channels into a multiplexed digital signal, a register for storing intermediate results, an adder for adding samples of the digital communication channels and intermediate results stored in the register, wherein one of the inputs of the adder is connected to the multiplexer via a connection line having the first bit width, the other input of the adder is connected to the output of the register via a connection line having a second bit width, and the input of the register is connected to the output of the adder via a connection line having the second bit width, and wherein, in a number of cycles corresponding to the number of digital communication channels, one combined output sample is generated by successively adding in each one cycle one sample of one of the communication channels to a previously obtained intermediate result stored in the register.

The object of the invention is further solved by a device for combining, in a plurality of cycles, a plurality of digital communication channels, each being transmitted via communication lines having a first bit width, comprising a cascade arrangement of a plurality of apparatuses, each including: a multiplexer for multiplexing the plurality of digital communication channels into a multiplexed digital signal, a first register for storing intermediate results, an adder for adding samples of the digital communication channels and intermediate results stored in the first register, wherein one of the inputs of the adder is connected to the multiplexer via a first connection line having the first bit width, the output of the adder is connected to the input of the first register via a second connection line having a second bit width larger than the first bit width, and the output of the first register is connected to the other input of the adder via a third connection line having the second bit width, wherein, in a number of cycles corresponding to the number of digital communication channels, one combined output sample is generated by successively adding in each one cycle one sample of one of the communication channels to a previously obtained intermediate result stored in the first register, and wherein the output bit width of an apparatus of a particular stage of the cascade arrangement is determined by $\lceil \lg_2(ni(2^{wi}-1)) \rceil$ with ni=number of input signals of the apparatus of a particular stage and wi=bit width of input signals.

According to the invention, the number of adders needed for summing up the plurality of digital communication channels, e.g., to form a digital CDMA transmission signal, may advantageously be reduced.

Advantageously, the second bit width may be the smallest integer equal or larger than a first limit determined by $$(\lg_2 \cdot (\text{number of channels} \cdot (2^{first\ bit\ width}-1))).$$

Thus, the bit width of the second, third and fourth connection line may be minimized with respect to the bit width of the communication lines of the communication channels.

Further, the second bit width may the smallest integer equal or larger than a second limit determined by $$(\lg_2 \cdot (\text{number of channels} \cdot (2^{average\ signal\ bit\ width}-1))),$$

and thus the bit widths of the second, third and fourth connection line may be minimized with respect to the average bit width needed for a representation of the communication signals.

The second bit width may also be an integer equal or smaller than the first limit and equal or larger than the second limit.

Further, according to the invention, a cascade arrangement of combining circuits may be provided. Further advantageous embodiments of the invention are described in further dependent claims.

BRIEF DESCRIPTION OF THE FIGURES

The invention may be best understood, if read together with the accompanying drawings, wherein.

DETAILED DESCRIPTION OF EMBODIMENTS

In the following, preferred embodiments of the invention will be described with respect to FIG. 1 and FIG. 2.

Figure 1:
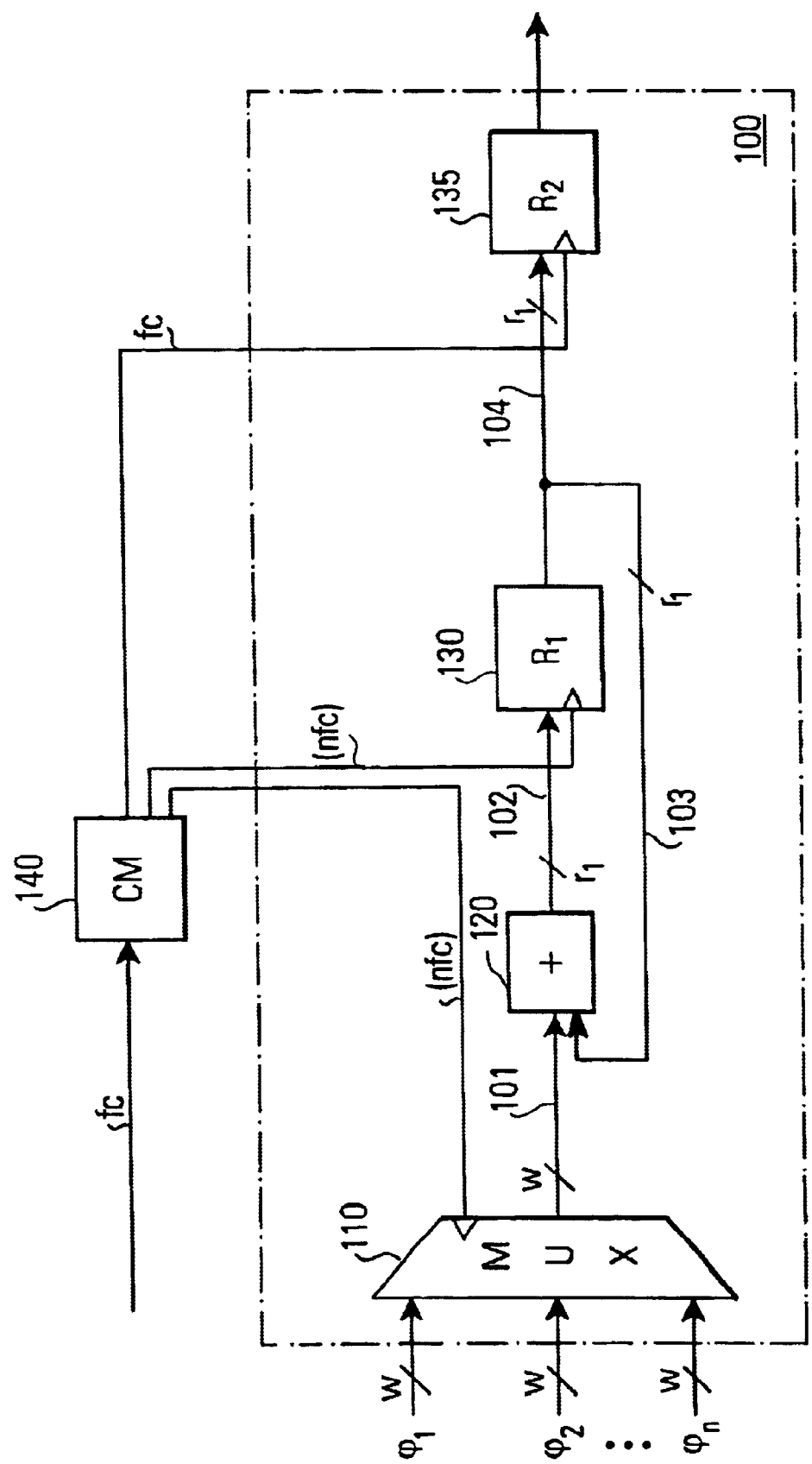
FIG. 1 shows a preferred embodiment of the invention for combining a plurality of communication signals into a single transmission signal.
Figure 2:
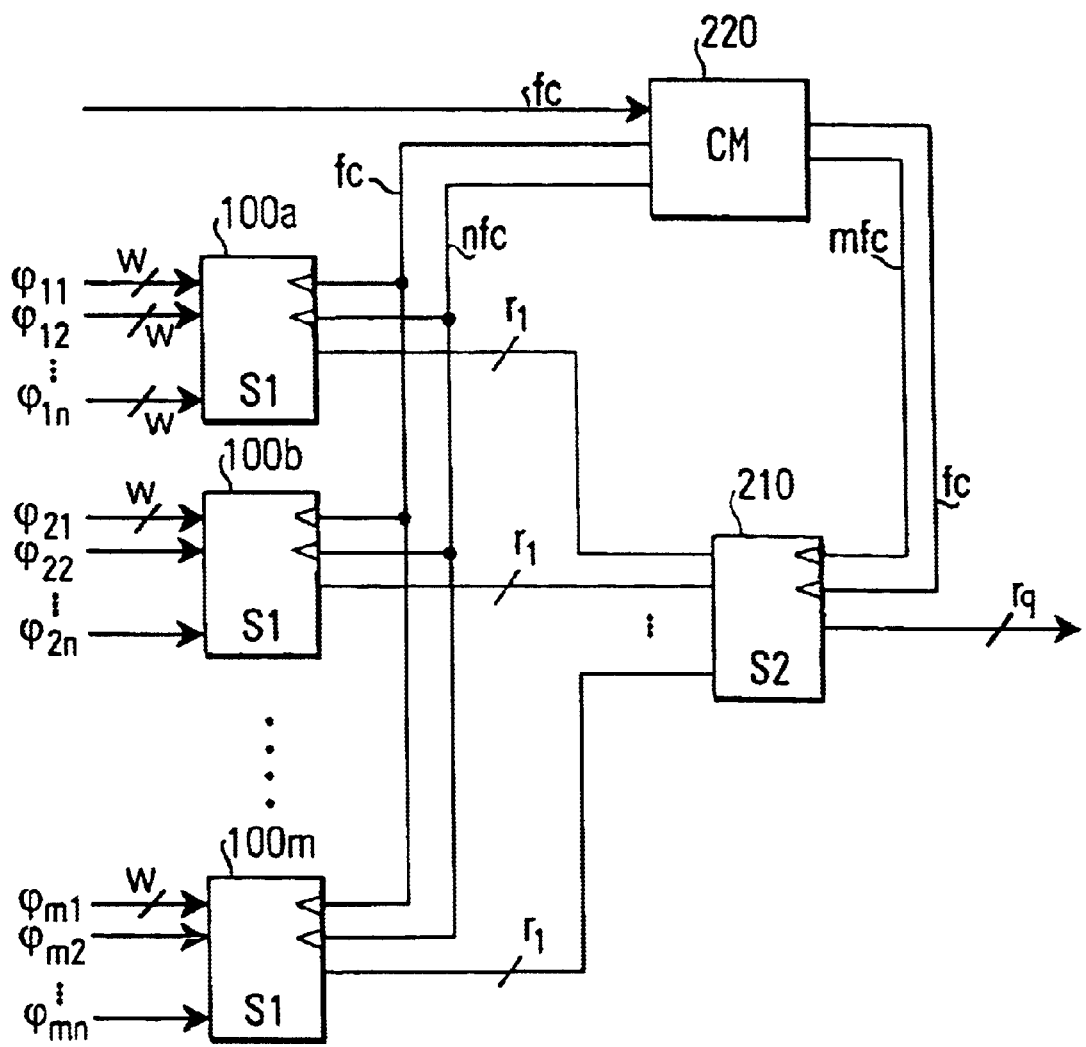
FIG. 2 shows an embodiment of the invention comprising several arrangements of FIG. 1, arranged in cascade, for combining a larger number of communication channels.
Figure 3:
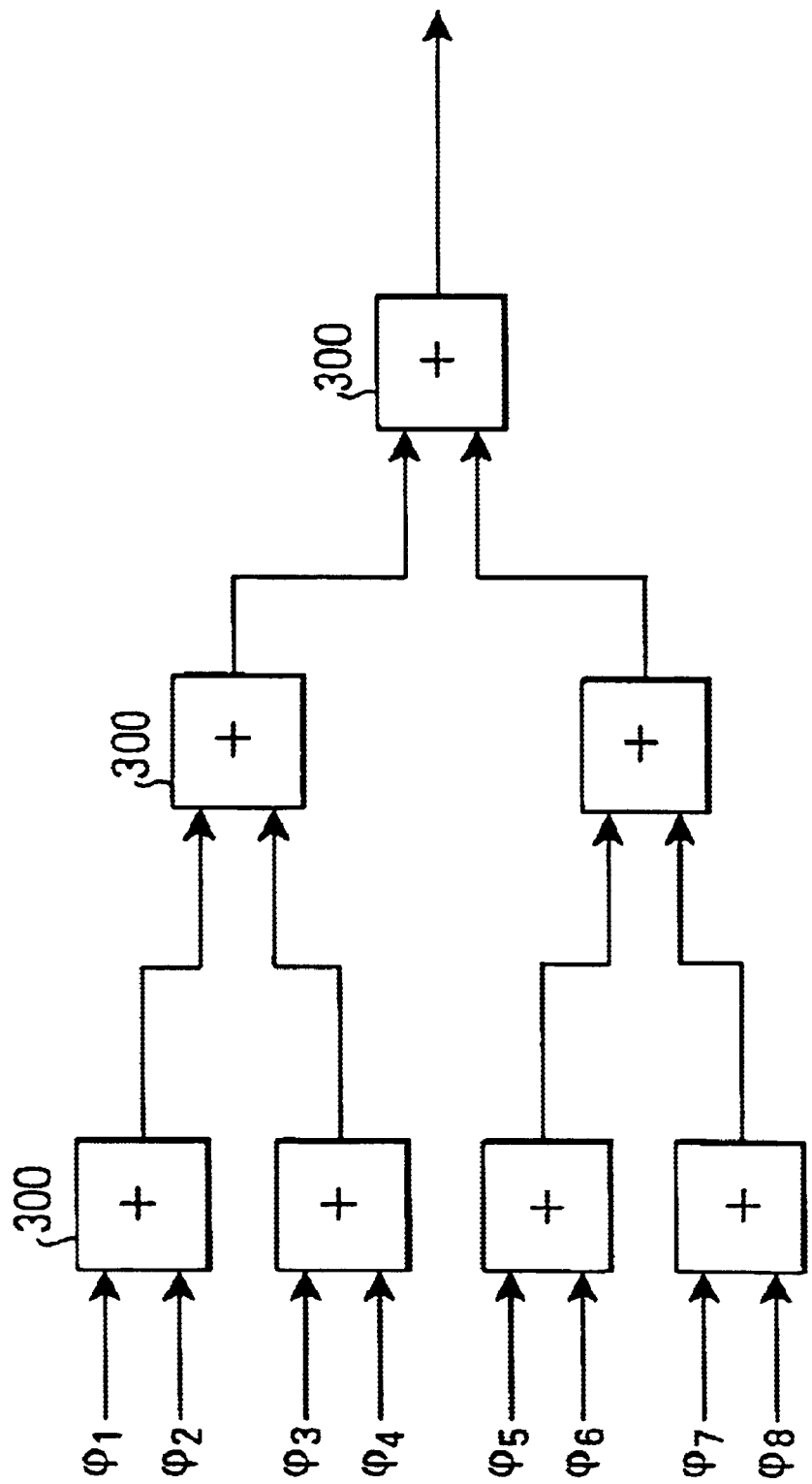
FIG. 3 shows a known arrangement of adders for combining communication channels.

FIG. 1 shows an example of the inventive circuit 100 for combining a plurality of spread and weighted communication channel signals. As outlined above, each of the communication channel signals has been spread individually, that is, each symbol of the incoming data stream of a communication channel, e.g., having a logical value 1 or 0, is represented using a particular code sequence. For example, if the symbol has the logical value 1, the code sequence itself is transmitted, if the data bit has the logical value 0, then the inverted code sequence is transmitted, or vice versa. After spreading, all communication channel signals have the same data rate, commonly referred to as chip rate.

Further, each of the communication channel signals is weighted individually. The weighting is performed in accordance with propagation characteristics of the radio signal (after combining) transmitted to a receiving station. A communication signal for a receiving station located far away or shadowed by buildings, etc., will thus be weighted with a larger weighting factor, whereas a communication channel signal to a receiving station nearby will be weighted with a smaller weighting factor. Hence, the weighting factor determines the magnitude of a communication channel signal.

However, for technical reasons, the weighting and thus the maximum amplitude of a communication signal after weighting is limited. Hence, the amplitudes of all communication channel signals will be below a certain limit value and therefore, the communication channel signals may be transmitted without loss via lines having a predetermined bit width.

It is noted that in principle any signals transmitted via transmission lines having a predetermined bit width may be processed by the inventive circuit, however, preferably, communication channels of a CDMA communications network are combined into a transmission signal.

In the following, the circuit according to FIG. 1 will be outlined in detail. A multiplex circuit 110 receives n communication channel signals φ1–φn as an input via lines having a predetermined bit width w. The multiplex circuit 110 is arranged for successively placing samples of the digital communication channel signals onto a first connection line 101 to an adder 120 for adding samples of the digital communication channels and intermediate results stored in a first register 130. The first connection line 101 will preferably also have a bit width w, since with the multiplexer the data rate to be transmitted is increased, but not the magnitude of signals. For example, if n=8 and each of the communication channels after spreading has a chip rate of 512 ksps (kilo samples per second), then the multiplexer will output 4096 ksps.

The output of the adder 120 is connected to the first register 130 for storing intermediate results transmitted via a second connection line 102. The output of the first register 130 again is connected to the second input of the adder 120 via a third connection line 103. Also the output of the first register 130 is connected to a second register 135 via a fourth connection line 104. After accumulating one sample for each communication channel, that is after n clock cycles, the value stored in the first register 130 represents one sample of the combined signal, e.g., a CDMA signal. This value is then transferred to the second register 135 for further processing.

Control means 140 may be provided for controlling the operations of the multiplexer 110, the first register 130 and the second register 135. The control means is provided with an external clock rate fc corresponding to the sample rate of the communication channels. Since n communication channels are to be operated on, the control means operates the multiplexer 110 with an internal clock rate n times higher, i.e., n·fc. Further, in order to accumulate one sample per channel for one operation, the first register will also be clocked at a rate of n·fc. The second register 135, however, will again be operated at the external clock rate fc of the communication channels, which is also the rate of the combined signal.

Thus, the adder, first register and multiplexer will preferably be operated at a frequency equal to the product of the chip rate of the channels and the number of channels to be combined.

In the following, the operation of the circuit for obtaining a single sample of the W-CDMA signal is described. One operation corresponds to one external clock cycle with the rate fc.

The register 130 is assumed to be initially set to zero. In a first internal clock cycle, the multiplexer supplies one sample of the first communication channel φ1 via the first connection line 101 to the adder 120. The internal clock cycle has the rate n·fc, as outlined above, and during one operation n internal clock cycles occur. Since the first register 130 is assumed to be initially set to zero, the value of the sample of the first communication channel φ1 is supplied by the adder and stored in the first register 130 via the second connection line 102.

In a second internal cycle, the multiplexer 110 supplies one sample of the second communication channel φ2 via the first connection line 101 to the adder 120. At the same time the adder receives as second input signal the contents of first register 130, at this point in time constituted by the first sample, via the third connection line 103. Consequently, after the second adding operation, i.e., after the second internal cycle, the samples of the communication channels φ1, φ2 are accumulated. The result of the accumulation operation is, as part of the second cycle, supplied and stored in the first register 130 via the second connection line 102, overwriting the previously stored value.

In a third internal cycle the multiplexer 110 supplies one sample of the third communication channel φ3 via first connection line 101 to the adder 120, which subsequently adds it and the value supplied from first register 130, being constituted by the sum of the channels φ1 and φ2. The result is again stored in the first register 130, now representing the sum of the first three communication channels φ1, φ2 and φ3.

For each internal cycle this process is now repeated, i.e., for the samples of all remaining communication channels. Hence, each one symbol of all remaining channels is accumulated and therefore, after n adding operations a first sample of the combined signal is obtained, either from the output of the adder or, after the n th operation, from the second register 135. Thus, for each n cycles, one sample of the combined signal may be obtained.

As the rate of the combined signal should be equal to the rate of the digital communication channels, one internal cycle should last for one n-th of the operation period.

Since each of the communication signals is represented by samples having a bit width w, the accumulation result, i.e., a sample of the combined signal may have a bit width larger than w. More specifically, for each accumulation cycle of the circuit, the needed bit width for the second connection line 102 from the adder 120 to the first register 130 and for the third connection line 103 from the register back to the second input of the adder 120, an increasingly larger bit width may be needed. Obviously this applies to the fourth connection line 104. Thus, in order to avoid erroneous combining results, the second, third and fourth connection line 102, 103 and 104 need a bit width larger than w.

A sufficiently large bit width for the second, third and fourth connection line 102, 103 and 104 may be determined, if it is considered that a number of n different communication channel signals are to be combined, each having a bit width of w bits. The final accumulation result, i.e., a sample of the combined signal, will have a maximum bit width $r_1$ determined by the following equation:

$$r_1 = \rceil lg_2(n(2^w-1))\lceil \qquad \text{Eq1}$$

with $lg_2$ n the logarithm dualis of the number n of digital communication channels, and $\rceil x \lceil$ denoting the ceiling operation selecting the smallest integer value equal to or larger than x. This operation is necessary since the bit width of the connection lines can obviously only assume integer values.

Accordingly, if the bit width of the second, third and fourth connection lines 102, 103 and 104 are designed such that they at least exhibit a bit width of $r_1$, a combining of the n communication channels can be correctly performed.

With the above conditions satisfied, hardware requirements of the inventive circuit may be reduced, leading to reduced costs for the combiner circuit for combining the plurality of communication channels.

For an even further reduction of hardware requirements, it may be considered, that not all communication channels will always make use of all w bits for representing communication channel samples. During operations of a communication system, an average needed bit width or average signal bit width $w_{avg}$ may be determined as an average number of bits needed to represent samples of the plurality of communication channels to be combined. Thus, in an alternative embodiment, the bit width of the second, third and fourth communication lines 102, 103 and 104 may be determined by the following relation:

$$r_2 = \rceil lg_2(n(2^{w_{avg}}-1)) \qquad \text{Eq2}$$

Thus, by considering the mean magnitudes of the communication channel signals after weighting, the requirements for hardware may be further reduced.

Preferably, according to an embodiment of the invention, the bit widths of the second, third and fourth communication lines 102, 103 and 104 may be within the range delimited by $r_1$ and $r_2$. That is, the bit widths of the second, third and fourth communication lines may be in the interval $[r_1; r_2]$.

In the following, with respect to FIG. 2, a further embodiment of the present invention will be described. FIG. 2 illustrates, how a plurality of combiner circuits 100, as described with respect to FIG. 1, may be connected in a cascade for allowing an adaptation to different numbers of communication channels.

A number of m combiner circuits 100a, 100b, ..., 1000m of a first stage S1, each one for combining n communication channels φ11, ..., φ1n; φ21, ..., φ2n; φm1, ..., φmn, is shown. Further, as a second stage S2, a combiner circuit 210 for combining the m output signals of the first stage is illustrated.

As it was outlined with respect to FIG. 1, the transmission lines for each of the communication channels will have a bit width w and, also in accordance with the above description of FIG. 1, the output lines of the each of the combiner circuits 100a, 100b, ..., 100m will each have a bit width $r_1$ according to Eq.(1).

Hence, the combiner circuit 210 receives as an input the output signals from the combiner circuits 100a, 100b, ..., 100m of the first stage, each having a bit width $r_1$. And therefore, in accordance with the above, the combiner circuit 210 of the second stage S2 will have an output bit width of $$r_q = \rceil lg_2(m(2^{r_1}-1))\lceil \qquad \text{Eq3}$$

for combining all input communication channels without loss.

Further, control means 220 are provided for controlling the operation of the cascade arrangement of combiner circuits. As in the first embodiment, the control means receives an external clock with the rate fc corresponding to the sample rate of the communication channels. Accordingly, as before, the circuits 100a, 100b, ..., 100m of the first stage will be controlled by the external clock at the rate fc and at an internal clock with the rate n·fc.

Further, the combiner circuit 210 of the second stage will be operated at a rate being m times higher than the rate of the combiner circuits of the first stage. Therefore, the first register and the multiplexer of the combiner circuit 210 of the second stage will be controlled using a clock with the rate m·fc. The second register of the circuit 210 of the second stage is operated at a rate fc corresponding to the rate of the combined signal.

According to the above, if a plurality of stages is provided, each combiner circuit of a particular stage of the cascade arrangement has an output bit width $$wo = \rceil lg_2(ni(2^{wi}-1))\lceil \qquad \text{Eq4}$$

with ni=number of input signals of the combiner circuit of a particular stage, wi=bit width of input signals, and $\rceil x \lceil$ again denoting the ceiling operation selecting the smallest integer value equal to or larger than x.

What is claimed is:

1. Apparatus for combining, in a plurality of cycles, a plurality of digital communication channels, each being transmitted via communication lines having a first bit width, comprising:

a multiplexer for multiplexing the plurality of digital communication channels into a multiplexed digital signal, a first register for storing intermediate results, an adder for adding samples of the digital communication channels and intermediate results stored in the first register, wherein one of the inputs of the adder is connected to the multiplexer via a first connection line having the first bit width, the output of the adder is connected to the input of the first register via a second connection line having a second bit width larger than the first bit width, and the output of the first register is connected to the other input of the adder via a third connection line having the second bit width, and wherein, in a number of cycles corresponding to the number of digital communication channels, one combined output sample is generated by successively adding in each one cycle one sample of one of the communication channels to a previously obtained intermediate result stored in the first register.

2. Apparatus according to claim 1, wherein the second bit width is the smallest integer equal or larger than a first limit determined by $$lg_2(n(2^w-1))$$

with n=number of communication channels, and w=the first bit width.

3. Apparatus according to claim 1, wherein the second bit width is the smallest integer equal or larger than a second limit determined by $$lg_2(n(2^{w_{avg}}-1))$$

with n=number of communication channels, and $w_{avg}$=average signal bit width.

4. Apparatus according to claim 2, wherein the second bit width is an integer equal or smaller than the first limit and equal or larger than the second limit.

5. Apparatus according to claim 1, wherein the combined output symbols are transmitted to a second register for further processing via a line having the second bit width.

6. Apparatus according to claim 1, wherein the communication channel signals to be combined are signals transmitted in a CDMA telecommunications system.

7. Device for combining, in a plurality of cycles, a plurality of digital communication channels, each being transmitted via communication lines having a first bit width, comprising a cascade arrangement of a plurality of apparatuses, each including:

a multiplexer for multiplexing the plurality of digital communication channels into a multiplexed digital signal, a first register for storing intermediate results, an adder for adding samples of the digital communication channels and intermediate results stored in the first register, wherein one of the inputs of the adder is connected to the multiplexer via a first connection line having the first bit width, the output of the adder is connected to the input of the first register via a second connection line having a second bit width larger than the first bit width, and the output of the first register is connected to the other input of the adder via a third connection line having the second bit width, wherein, in a number of cycles corresponding to the number of digital communication channels, one combined output sample is generated by successively adding in each one cycle one sample of one of the communication channels to a previously obtained intermediate result stored in the first register, and wherein the output bit width of an apparatus of a particular stage of the cascade arrangement is determined by $$\lceil lg_2(ni(2^{wi}-1)) \rceil$$

with ni=number of input signals of the apparatus of a particular stage, wi=bit width of input signals.

8. Apparatus according to claim 3, wherein the second bit width is an integer equal or smaller than the first limit and equal or larger than the second limit.

* * * * *